United States Patent [19]
Hicks, Jr.

[11] 3,926,601
[45] Dec. 16, 1975

[54] METHOD FOR MAKING GLASS BLADES

[76] Inventor: John Wilbur Hicks, Jr., Apple Hill Road, Sturbridge, Mass. 01566

[22] Filed: June 10, 1974

[21] Appl. No.: 478,053

Related U.S. Application Data

[62] Division of Ser. No. 224,533, Feb. 8, 1972, Pat. No. 3,831,466.

[52] U.S. Cl. .................. 65/31; 65/4; 76/DIG. 8; 30/53; 30/346.5; 156/24
[51] Int. Cl.² ................. C03C 15/00; C03C 23/20
[58] Field of Search ..... 65/31, 4; 76/104 R, DIG. 8; 30/346.5, 53; 156/24

[56] References Cited
UNITED STATES PATENTS

| | | | |
|---|---|---|---|
| 3,275,428 | 9/1966 | Siegmund ........................... | 65/31 X |
| 3,607,485 | 9/1971 | Bailey et al. ....................... | 65/31 X |
| 3,771,983 | 11/1973 | Straka ................................ | 65/31 X |
| 3,805,387 | 4/1974 | Siegmund et al. ................... | 65/4 X |

Primary Examiner—S. Leon Bashore
Assistant Examiner—Frank W. Miga
Attorney, Agent, or Firm—Stanley J. Yavner

[57] ABSTRACT

A blank of a plurality of vitreous materials is prepared by selecting a first vitreous material which is relatively resistant to chemical etching and grinding it to a desired blade configuration with dimensions which are a multiple of the dimension of the desired end product as represented by a predetermined attenuation ratio, then a second vitreous material which is susceptible to chemical etching is selected and prepared to have a portion complementary to said blade portion of said first material, and the blank comprising both materials positioned in complementary contacting relationship is heated to about their softening points and drawn down with a desired attenuation to produce a continuous blade ribbon in said first vitreous material of uniform predetermined cross-sectional dimensions. The second material is then etched away from the ribbon comprising the first material and cut into desired blade lengths.

9 Claims, 18 Drawing Figures

U.S. Patent  Dec. 16, 1975  Sheet 1 of 2  3,926,601
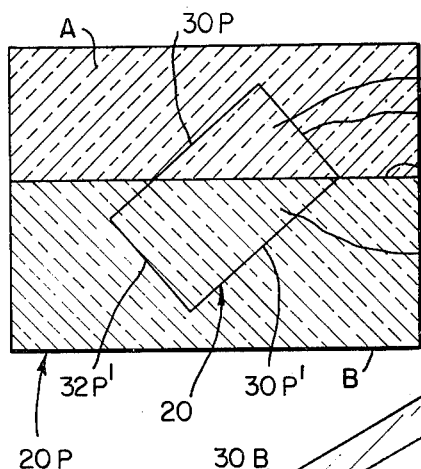
FIG. 1
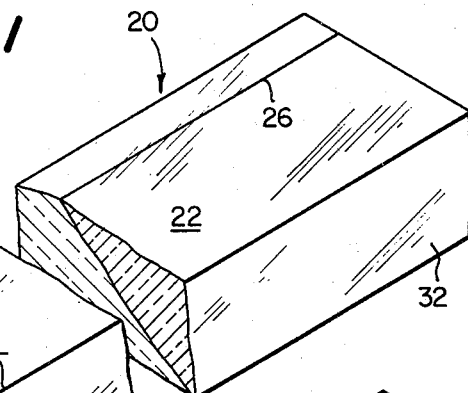
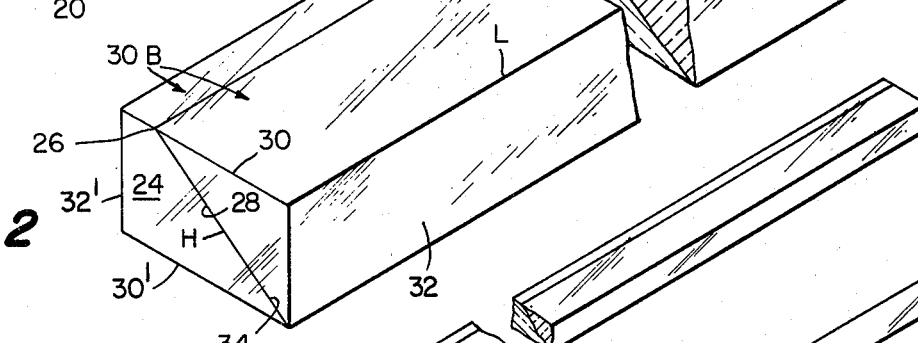
FIG. 2
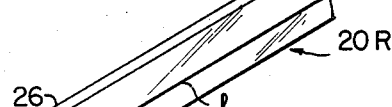
FIG. 3
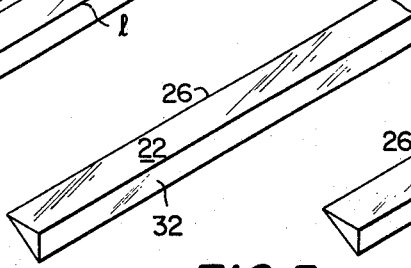
FIG. 4  FIG. 5
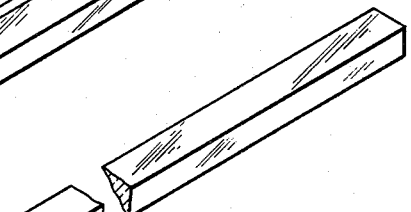
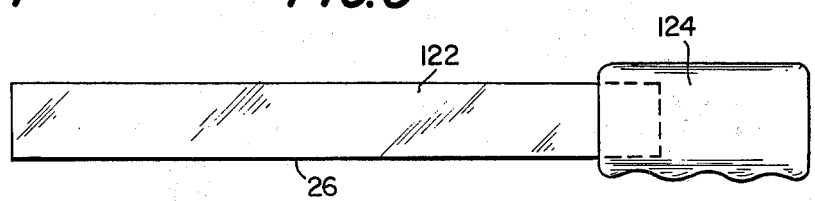
FIG. 8
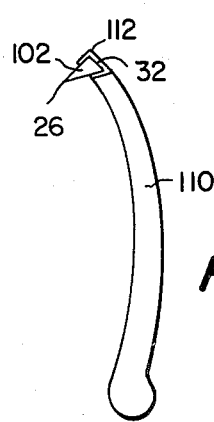
FIG. 6
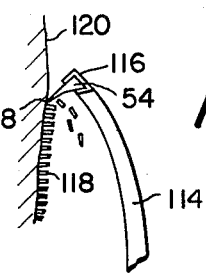
FIG. 7

METHOD FOR MAKING GLASS BLADES

This is a division of application Ser. No. 224,533, filed Feb 8, 1972, now U.S. Pat. No. 3,831,466, issued Aug. 27, 1974.

BACKGROUND OF THE INVENTION

The invention relates to manufacture of blades, and particularly is concerned with the manufacture of blades such as glass razor blades.

Glass razor blades are described in U.S. Pat. No. 2,555,214 to Wallach et al., and in U.S. Pat. No. 3,607,485 to Bailey et al. The earlier patent discloses the grinding of each individual full sized razor blade blank to substantially ultimate keeness and then subjecting the blank to a series of 10–15 immersions of about 5 seconds each in a bath of concentrated hydrofluoric acid. It is quite difficult to repeatedly produce a uniform product and the process is extremely slow since it requires a relatively long acid polishing operation to eliminate the raw grinding flaws. Further, it is virtually impossible to grind edge configurations other than a conventional V-shaped edge.

The Bailey patent discloses the preparation of a greatly enlarged blank ground to a desired configuration, and then drawing and attenuating such blank while retaining its relative dimensions to produce a uniform strip or ribbon of razor blade configuration from which a large number of blades are cut and finished.

One problem which still persists in the manufacture of glass blades, especially by the attenuation method, is the effect of rounding in non-circular contours (such as a sharp blade edge for example) resulting from the action of the surface tension of the vitreous material as it is being drawn out. The sharp cutting edge which should have an extremely small radius of curvature becomes rounded until the radius of the curvature becomes large enough to provide an undesirable dull cutting edge. This necessitates further steps of polishing and treatment to effect a finer cutting edge, sometimes without success.

SUMMARY OF THE INVENTION

The present invention provides for the manufacture of a new type of glass blade by a method which virtually minimizes the rounding of the blade after direct drawing and attenuation by reason of the surface tension of the material of the blade.

If a glass rod of circular cross section is drawn down (without the use of dies) as in fiber optics drawing, for example, as described in U.S. Pat. No. 3,589,793 to Curtiss, the cross-sectional geometry of the smaller rod will be a scaled down replica of the original. Attenuation by drawing of a rod, or blank, having a sectional formation other than circular will not result in an accurate geometric reproduction of sharply angled or cornered position. The drawing operation tends to round off the contours. It is known that a 0.002 square fiber cannot be drawn with a radius of curvature less than 0.00025" at the corners except with the greatest of difficulty. One method known to the art for drawing glass and maintaining reasonably small radii of curvature at sharp sections is by providing a long furnace so that the cone angle of the drawing cone remains as small as possible. However, the use of the long furnace in the operation will not produce a blade edge of the required keeness to be used as a razor, for example, The edge of the blade of this invention is made by the mode of the invention which produces an extremely sharp edge with a relatively small radius of curvature.

This is accomplished by providing a blank made of at least two vitreous materials wherein the edge of the blade is comprised in the first of such materials and the second of such materials is used to cover the blade edge with a complementary contour so that the blade edge will not be at the surface of the blank during drawing and attenuation.

The usual blunting by rounding of a sharp edge at the surface of such a blank virtually disappears when the edge is included in the blank away from the surface.

The first material in which the edge is included is selected from a vitreous material relatively resistant to chemical etching and the second or cover material is selected from a vitreous material which is readily suscepticle to chemical etching. Thus as the blank is drawn out and the blade edge of desired dimension is formed in the first vitreous material, the second or cover material is etched away by chemical means leaving the sharply edged blade of the first material uncovered. The resulting elongated strip or ribbon may then be cut into sections of desired length and made into razor blades, knives or other articles requiring sharp edges.

This invention therefore relates to the production of sharp cutting edges by controlling the reduction of curvature of the edge during the processes of drawing out the vitreous blank in the manner and by the construction indicated.

BRIEF DESCRIPTION OF THE DRAWINGS

FIG. 1 is a sectional view in enlarged scale of a preliminary starting blank made of a first and second material in accordance with the invention;

FIG. 2 is a perspective view of a combination blank made in accordance with the invention, cut from the blank of FIG. 1, along lines 30P, 32P, 30P' and 32P';

FIG. 3 is an enlarged perspective view of a blade ribbon drawn from the blank in FIG. 2;

FIG. 4 is a perspective view of the blade ribbon shown in FIG. 3 after the second material has been removed;

FIG. 5 is a perspective view of a finished blade made from the ribbon shown in FIG. 4;

FIG. 6 is a side elevation of a blade as shown in FIG. 5 in combination with a blade holder;

FIG. 7 is a side elevation partly in section with parts cut away, otherwise similar to FIG. 6 except that a different form of blade is included;

FIG. 8 is a side elevation showing another form of blade in combination with a handle;

DESCRIPTION OF THE PREFERRED EMBODIMENT

The Combination Blank

Figure 9:
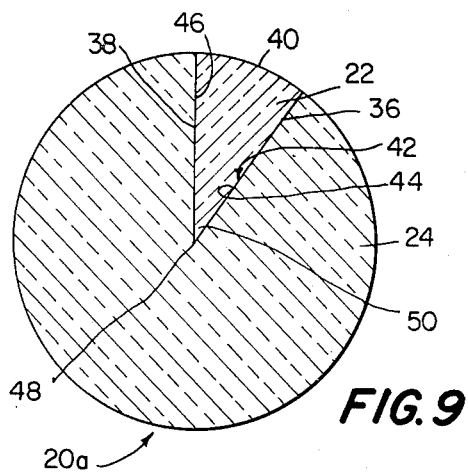
FIG. 9 is a sectional view of a second form of combination blank.

A combination blade blank 20 is shown in FIG. 2. It is comprised of a first vitreous material 22 and a second vitreous material 24. The first material 22 should be resistant to etching to the extent that the sharp edge 26, which is formed at the juncture of first side 28 and second side 30, will not be undesirably blunted by etching action of the etching solution. A suitable etching solution would be 10% by volume HCL acid.

The second material 24 should be susceptible to etching by the HCL acid solution and should have the property of being able to etch very clean leaving substantially no residue adhering to the first material 22, particularly along the sharp edge configuration 26.

In FIG. 2 of the drawings the first material 22 is wedge formed and in cross section has an enclosed perimeter formed by the first side 28, the second side 30 and a back portion 32. The second material 24 is formed complementary to the first material 22 and has a side 34 which is in face contacting relationship with first side 28 of first material 22. In the preferred form of the invention the sides 28 and 34 contact at their entire surfaces, however it is sufficient if side 34 is in contact with sharp edge 26 formed in part by surface 28, as it is the edge 26 which the invention protects from blunting.

The relative viscosity of the materials 22 and 24 may vary somewhat. However, too much of a diversion may affect the shapes of the materials near and outer surfaces. If the original rod of the combination blank 20 is prefused and allowed to cool, the thermal expansions should be well matched so that the rod of the blank 20 will not break. It is not necessary, however, to prefuse the two parts as the fusion will occur during or just preceding the drawing, as will be described hereinbelow.

There are many glass combinations which meet all of the requirements of the vitreous materials of the invention reasonably well. A preferred example of the acid resistant vitreous material 22 is Schott's Z K-1 and a preferred example of the vitreous material susceptible to etching 24 is Schott's La K-3, both products being sold by the Schott Glass Company of Mainz, Germany.

The following chart shows the chemical composition of and other examples of the combination of vitreous materials 22 and 24.

| | % OX Weight | |
|---|---|---|
| | First Material 22 | Second Material 24 |
| $SiO_2$ | 55.9 | 11.3 |
| $B_2O_3$ | 7.0 | 16.0 |
| $Al_2O_3$ | — | 3.8 |
| $BaO$ | — | 47.3 |
| $La_2O_3$ | — | 13.6 |
| $ThO$ | — | 8.0 |
| $Na_2O$ | 1.0 | — |
| $K_2O$ | 16.0 | — |
| $ZnO$ | 20.1 | — |

It has been found that an etching solution of 10% HCL acid by volume will etch material 24 clean away from material 22 without blunting the edge 26. It has also been found that vitreous material Ba L F-8 of the Schott Glass company is suitable for the blade material of the first material 22.

In FIG. 9 of the drawings another form of combination blank 20a is shown in which the first material 22 is in the form of a wedge having a cross section with a closed perimeter formed by the first side 36, the second side 38 and the curved outside surface, or back, 40. The second material 24 is formed to be complementary to the first material 22 and in cross section has a wedge-shaped groove 42 formed by a first side 44 and a second side 46 which join at reference numeral 48 to form an inside angle complementary to the acute angle of edge 50 of the first material 22.

Figure 10:
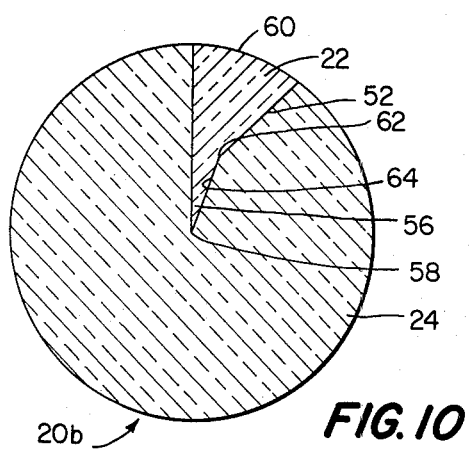
FIG. 10 is a sectional view of a third form of combination blank.

FIG. 10 of the drawings shows a third form of combination blank 20b which is substantially similar to blank 20a except that one of the sides 52 of the portion of the blank made out of material 22 is non-planar. This has been done to form a blade 54 as shown in FIG. 7.

The leading portion 56 of blade material 22 of blank 20b, adjacent the sharp edge 58, is extremely thin while the material at the trailing end 60 is much thicker, thereby strengthening the resulting blade 54. This is provided for by the angle 62 in non-planar side 52. In the form of invention shown in FIG. 10 the second material 24 is formed in a shape complementary to the first material 22 and it has a wall or side 64 which is also non-planar and complementary to wall 52 of the first material 22.

Figure 11:
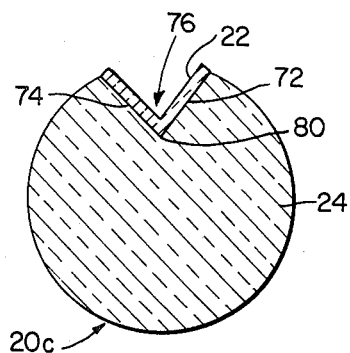
FIG. 11 is a sectional view of a fourth form of combination blank.
Figures 14, 15, 16, 17:
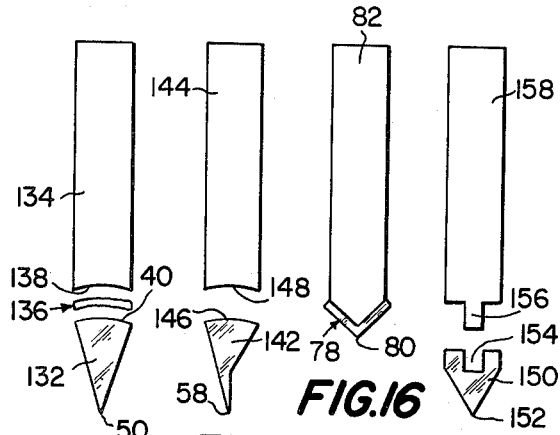
FIG. 14 is an exploded side elevation of a form of blade resulting from the blank shown in FIG. 9.
FIG. 15 is an exploded side elevation of a form of blade resulting from the blank shown in either FIG. 10 or FIG. 12.
FIG. 16 is a side elevation showing a form of cutting blade resulting from the blank shown in FIG. 11.
FIG. 17 is an exploded side elevation showing a form of blade in combination with a blade holder and a tongue and groove connecting means.

In FIG. 11 of the drawing another form of invention is shown where the first material 22 of the blank 20c is provided with a first side 72 and a second side 74 in V-shaped formation leaving a groove or hollow 76 on the upper side, or back, as shown in FIG. 11. This provides a blank 20c for a cutting blade 78 with a sharp cutting edge 80 which may be adapted for attachment to a blade holder portion 82, as shown in FIG. 16.

The perimeter of the cross section of the first material 22 of combination blank 20c is nevertheless a closed perimeter having the first side 72 and the second side 74 forming a sharp edge 80. The second material 24 is formed complementary to the first material 22 in accordance with the description of the invention as set forth herein and above.

Figure 12:
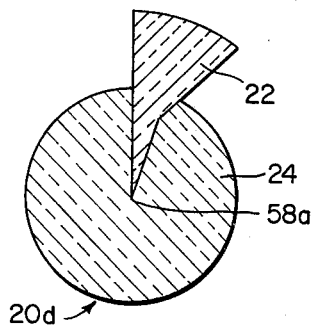
FIG. 12 is a sectional view of a fifth form of combination blank.

FIG. 12 of the drawings is provided to show a blank 20d similar to blank 20b in FIG. 10. However in blank 20d the second material 24 has been formed complementary only to a portion of first material 22 in intended contacting relationship. Sufficient complementary structure is provided to insure the protection of edge 58a from blunting.

The Method

In order to form a combination blank 20 with a cutting edge 26 in a first material 22 in combination with the complementary second material 24, a preliminary blank 20P is first prepared by fusing two rectangular rods A (of first material 22) and B (of second material 24) together along surfaces defined by line 28P in FIG. 1. Glass blank 20 is then sawed out of preliminary blank 20P along sides or planes defined by lines 30P, 32P, 30P' and 32P'. The resulting raw surfaces 30, 32, 30' and 32', respectively, forming glass blank 20, are then fine ground.

Referring now to FIG. 2, the acute angle forming sharp edge 26 in material 22 is seen lying at the intersection of the planes which include first side 28 and second side 30. The sharp edge 26 is supplied to material 22 by cutting blank 20P along the plane in which line 30P lies, at an acute angle to the common plane (at line 28P) which lies between contacting materials 22 and 24. Blank surface 30B, which includes side 30, is then polished.

The glass blank 20 has been prepared as set forth above to desired dimensions so that edge L represents the length and H represents the hypotenuse of the cross section of the wedge formed by material 22 in FIG. 2.

Referring now to FIG. 3, a ribbon 20R redrawn from blank 20 is shown. By maintaining the proper parameters during the redrawing operation, the relative dimensions between blank 20 and the resulting ribbon 20R will remain constant such that $L/1 = d^2/D^2$.

Further, the specific angular configuration 26 of the glass blank 20 will be uniformly retained along the entire extent of the ribbon 20R.

Figure 18:
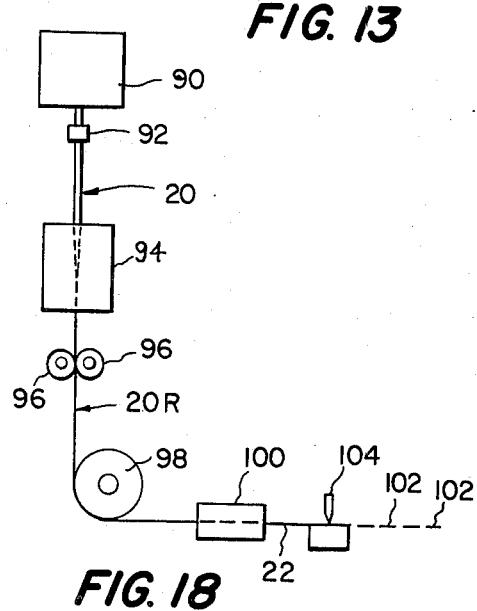
FIG. 18 is a diagrammatical view illustrating the preferred method of the invention.

Referring now to FIG. 18, a support member 90 is shown having a clamp 92 for controllably feeding the blank 20 into an electrically powered redraw furnace 94. The furnace has an open portion extending vertically therethrough which is lined with electric heating elements so as to soften the materials 22 and 24 of the blank 20 for attenuation as it passes through such opening. Suitable pulling means such as driven tractor belts or pull rollers 96 are driven to draw down and attenuate master blank 20 into blade ribbon 20R comprising materials 22 and 24. The downward drawn ribbon 20R is then preferably transposed to a horizontal position such as by a suitable idler roller 98, so that it may be passed through an acid bath 100, where the second material 24 is removed from the ribbon 20R by etching in the acid.

Only first material 22 with its sharp edge 26 now remains in the ribbon 20R (see FIG. 4). Ribbon 20R containing only first material 22 is now cut into blade portions 102 of desired lengths by cutters 104 (FIG. 18). A finished blade 102 with sharp edge 26 in material 22 is shown in FIG. 5.

The redrawing operation must be carefully controlled in order that dimensional uniformity and configuration integrity is maintained in the drawn ribbon. The hypothenuse attenuation ratio between the master blank and drawn ribbon may vary from about 3 to 500. The upper limit is merely deemed to be a practical upper limit, whereas poor dimensional control is evidenced when operating below the lower limit. The ratio is determined by the size of the starting combination blank and the desired blade size. The combination blank should be heated to a temperature approximately corresponding to the higher of the two softening points of materials 22 and 24 in order to provide the desired dimensional uniformity. The softening temperature corresponds to a viscosity of $10^{7.6}$ poises. The master blank may be satisfactorily redrawn at a viscosity of between approximately $10^5$ to $10^9$ poises.

The following is set forth as one specific example of forming blades in accordance with the present invention; however, it is to be understood that such an example is not limiting in nature.

A master blank 20 comprising materials 22 and 24 was prepared as shown in FIGS. 1 and 2 to a desired blade configuration with the blank being 12.0 inches long, 0.7 inches wide, and 0.3 inches thick; and with side 30 being 0.5 inches wide between edge 26 and back 32. The blank 20 was fed into a furnace at a rate of 0.5 inch per minute with the furnace heated to a point where the drawing tension was approximately 100 grams. The glass was withdrawn from the bottom of the furnace at a rate of 450 inches per minute, producing an elongated blade strip or ribbon having a length of approximately 900 feet, a width of 0.017 inches, and a thickness of 0.010 inches. The blade ribbon was then treated in an acid bath of 10% hydrochloric acid and cut into blades.

The acid bath step was provided to remove the material 22, and was not intended to polish the blade, since the edge 26 is supplied to the blade 102 when blank 20 is originally cut from preliminary blank 20P along line 28P, at which time side 30B of the blank 20 (FIG. 2) is polished.

It is evident that blades of various sizes for various purposes can be made by varying the size of the blank and the parameters of the drawing operation.

The Blades

Figure 13:
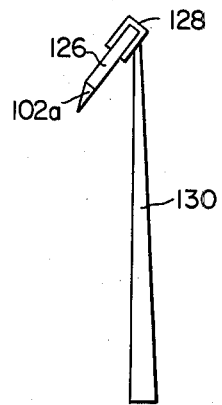
FIG. 13 is a side elevation.

Blades made in accordance with the invention can be used for razor blades and knife blades and any other type of blades designed for cutting and chopping operations. Examples of razor blades are shown in FIGS. 6, 7 and 13, and an example of a knife blade is shown in FIG. 8.

A blade 102 as shown in FIG. 5 is made from blank 20 as shown in FIG. 2. Blade 102 may be fitted to a handle 110 (FIG. 6) by means of a clamp 112 designed to fit around the back portion 32 of blade 102. Such a handle can be slide fitted on from an end toward the center of blade 102 leaving the sharp edge 26 in position, as shown in FIG. 6.

Blade 54 (FIG. 7) is made from a blank such as blank 20b, or 20d, and is designed to have a narrower width near the cutting edge 58 and a substantially broader width near its back, which is held in clamp 116 of a razor blade holder 114. In FIG. 7 a representation of a beard 118 on the surface of skin 120 is shown. It should be noted that only a small portion of the leading edge 58 of the blade 54 is concerned with the beard cutting operation.

The blades illustrated in FIGS. 13 through 17 of the drawings may be prepared with a small portion of the leading edge of the blade made of glass attached to a much larger blade portion which may be made of metal, plastic or other material. For example, in FIG. 13 a blade is shown which comprises a glass cutting portion 102a and a non-glass body portion 126. The combined blade 102a and 126 is held in a clamp 128 of a holder 130. Blade portion 102a is made in accordance with the invention in the same manner as blade 102 shown in FIG. 5. However, it may be made smaller than 102 if desired and cemented or fastened in any manner known to the art to body portion 126 which need not be made of glass. As was illustrated in FIG. 7, a small leading edge portion such as 102a will be sufficient to do the cutting required of a razor.

In the same manner a small leading edge portion can be affixed to a larger non-glass body portion in the manufacture of a knife blade. The advantage of the combined glass on non-glass construction is that many more thinner cutting edges can be made from a single blank during the drawing operation. These may be affixed to non-glass materials for strengthening. Another advantage would be that the non-glass body portion 126 could be provided with a new glass cutting edge 102a whenever desired, for the slight cost of attaching the new element. This would be particularly advantageous in the case of knives, where the blade body portion and handle elements might have a far greater value than the cutting edge element.

In FIG. 14 a cutting blade 132 having edge 50 (which may be made from a blank 20a as shown in FIG. 9) is shown, together with a non-glass body portion 134. Reference numeral 136 indicates a layer of cement which is used to bond cutting portion 132 to body portion 134 at ends 40 and 138, respectively. The cement 136 may be of any of the types well known in the art for bonding glass to metal.

In FIG. 15 another blade is shown comprising a cutting portion 142 (which may be made of either blank 20b or 20d) atttached to a body portion 144 at ends 146 and 148, respectively. Cutting edge 58 is narrow with relation to the balance of the construction for a short distance near the leading edge. A construction such as shown in FIG. 15 would be quite adaptable for a razor blade, as the finished blade is narrow near the leading edge for cutting the beard and yet wide for substantially the entire blade structure, for strength.

In FIG. 16 a combination cutting portion 78 and body portion 82 having a cutting edge 80 is shown. The cutting portion 78 could be made from a blank such as blank 20c. In FIG. 17 a cutting portion 150 is shown having a cutting edge 152 and a groove 154 designed to match a tongue 156 in a body portion 158 of non-glass material. While the body portions 126, 144, 158 and 82 have been described as being of a non-glass material, there is no reason why blades such as those shown in FIGS. 13 through 17 cannot be made of a glass cutting edge attached to a glass body portion.

A glass knife blade 122 with a cutting edge 26 is shown in FIG. 8 of the drawings attached to a handle such as a knife handle 124. Blade 122 is made in the same manner as blade 102 which has been illustrated in FIGS. 1 through 5 of the drawings, the only difference being that blade 122 is designed to be much larger in all dimensions than blade 102, since it is customary to make cutting knives with larger blades than razors.

While I have described my invention in its preferred form, there are other forms which it may take. For example, I have described and shown razor blades at least in FIGS. 6, 7 and 13 of the drawings herein. Similar razor blades can be made with blade edge guard elements usually associated with safety razors. Such guard elements can be supplied either on the blade or on the blade holder in any manner known to the art. I desire to be protected for all forms coming within the range of the claims hereinbelow.

Wherefore I claim:

1. The method of producing glass blades comprising the steps of a. forming a first vitreous material resistant to chemical etching with a sharp edge configuration, said material being of a cross-section having a perimeter with first and second sides intersecting at an acute angle to form said sharp edge configuration,
   b. forming a combination glass blank comprising
      1. said first vitreous material and
      2. a second vitreous material susceptible to chemical etching including a perimeter, part of which is in contact with at least a portion of one of said sides of said sharp edge configuration of said first material,
   c. heating such combination blank to a temperature corresponding to the softening points of the vitreous materials and sufficient to draw and attenuate same,
   d. drawing the heated combination blank and attenuating the same down to a desired size while protecting the sharp edge configuration by means of said contact,
   e. then removing the second vitreous material from the drawn and attenuated combination blank by means of a chemical etching process to which the second material is susceptible and to which the first material is resistant.

2. The method of producing glass blades as claimed in claim 1 in which the combination blank is formed in the form of a rod with the sharp edge of the first material located at a surface of the rod.

3. The method of producing glass blades as claimed in claim 2 which comprises the preliminary steps of producing a preliminary combination glass blank of the first and second vitreous materials in contacting relation to form a common plane and forming a sharp edge configuration in the first of said materials by cutting through said common plane at an acute angle.

4. The method of producing glass blades as claimed in claim 1 in which the combination blank is formed with the second material in face contacting relationship with the sharp edge and at least major portions of said first and second sides of said first material.

5. The method of producing glass blades as claimed in claim 1 in which the combination blank is formed in the shape of an elongated cylindrical rod.

6. The method of producing glass blades as claimed in claim 1 in which at least one of the said sides formed in the first material is non-planar.

7. The method as claimed in claim 1 which includes the further steps of cutting the first material into desired blade lengths.

8. The method as defined in claim 7 which includes the further steps of preparing a blade portion of non-vitreous material and affixing the glass blade thereto.

9. The method as defined in claim 7 which includes the further steps of preparing a blade holder and affixing the blade thereto.

* * * * *